(12) United States Patent
Shimazawa et al.

(10) Patent No.: US 11,043,240 B1
(45) Date of Patent: Jun. 22, 2021

(54) RHIR ALLOY NEAR-FIELD TRANSDUCER WITH RH TEMPLATE LAYER IN A THERMALLY ASSISTED MAGNETIC RECORDING (TAMR) APPLICATION

(71) Applicant: Headway Technologies, Inc., Milpitas, CA (US)

(72) Inventors: Koji Shimazawa, Cupertino, CA (US); Shengyuan Wang, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/800,029

(22) Filed: Feb. 25, 2020

(51) Int. Cl.
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
CPC .................... G11B 13/08; G11B 2005/0021
USPC ......................................... 360/125.3–125.35
See application file for complete search history.

(56) References Cited

U.S. PATENT DOCUMENTS

| | | | |
|---|---|---|---|
| 8,427,925 B2 | 4/2013 | Zhao et al. | |
| 8,488,419 B1 | 7/2013 | Jin et al. | |
| 8,619,518 B1 * | 12/2013 | Sasaki | G11B 5/314 369/13.33 |
| 8,804,468 B2 | 8/2014 | Zhao et al. | |
| 9,019,803 B1 | 4/2015 | Jin et al. | |
| 9,064,515 B2 | 6/2015 | Zhao et al. | |
| 9,099,112 B1 | 8/2015 | Balamane et al. | |
| 9,129,620 B2 | 9/2015 | Cheng et al. | |
| 9,466,320 B1 | 10/2016 | Staffaroni et al. | |
| 10,262,683 B2 | 4/2019 | Staffaroni et al. | |
| 10,332,553 B1 * | 6/2019 | Staffaroni | G11B 5/314 |
| 10,431,244 B2 | 10/2019 | Blaber et al. | |
| 2010/0202256 A1 * | 8/2010 | Ito | G11B 5/6088 369/13.33 |
| 2010/0329085 A1 * | 12/2010 | Kawamori | G11B 5/314 369/13.24 |

(Continued)

OTHER PUBLICATIONS

U.S. Office Action, U.S. Appl. No. 15/011,892, Applicant: Staffaroni et al., dated Dec. 14, 2016, 12 pages.

(Continued)

*Primary Examiner* — Allen T Cao
(74) *Attorney, Agent, or Firm* — Saile Ackerman LLC; Stephen B. Ackerman (57) ABSTRACT

A near field transducer (NFT) with an upper RhIr layer having an Ir content from 20-80 atomic % and a lower Au layer is formed between a waveguide and main pole at an air bearing surface (ABS). The RhIr layer has a rod-like front portion (peg) up to height h1, and a substantially triangular shaped back portion (body) from h1 to height h2. In some embodiments, there is a Rh underlayer with a thickness from 10 Angstroms to 200 Angstroms between the upper and lower NFT layers, and extending from the ABS to h2 so that the RhIr layer has a substantially uniform microcrystalline structure throughout to prevent thermally induced rupture defects proximate to h1. Optionally, the Rh underlayer may have a front side at h1, and may further comprise a lower Al or Zr adhesion layer. Accordingly, there is improved device reliability.

26 Claims, 11 Drawing Sheets

(56) References Cited

U.S. PATENT DOCUMENTS

| | | | |
|---|---|---|---|
| 2011/0176398 A1* | 7/2011 | Tanaka | G11B 5/6088 |
| | | | 369/13.33 |
| 2017/0221505 A1* | 8/2017 | Staffaroni | G11B 5/6088 |
| 2019/0066722 A1* | 2/2019 | Maletzky | G11B 5/3133 |
| 2019/0198053 A1 | 6/2019 | Krichevsky et al. | |

OTHER PUBLICATIONS

U.S. Office Action, U.S. Appl. No. 15/011,892, Applicant: Staffaroni et al., dated Mar. 29, 2017, 10 pages.

U.S. Office Action, U.S. Appl. No. 15/011,892, Applicant: Staffaroni et al., dated Aug. 7, 2017, 10 pages.

U.S. Office Action, U.S. Appl. No. 15/011,892, Applicant: Staffaroni et al., dated Jan. 5, 2018, 7 pages.

U.S. Office Action, U.S. Appl. No. 15/011,892, Applicant: Staffaroni et al., dated Aug. 27, 2018, 6 pages.

U.S. Notice of Allowance, U.S. Appl. No. 15/011,892, Applicant: Staffaroni et al., dated Dec. 21, 2018, 5 pages.

Barnes, W., et al., Surface plasmon subwavelength optics, Nature, vol. 424, pp. 824-830, Aug. 14, 2003, https://doi.org/10.1038/nature01937.

Challener, W. A., et al. Heat-assisted magnetic recording by a near-field transducer with efficient optical energy transfer, Nature Photon, vol. 3, pp. 220-224, Apr. 2009, https://doi.org/10.1038/nphoton.2009.26.

Wang Xiaobin, et al., HAMR Recording Limitations and Extendibilty, IEEE Transactions on Magnetics, vol. 49, No. 2 , Feb. 2013, pp. 686-692.

* cited by examiner

RHIR ALLOY NEAR-FIELD TRANSDUCER WITH RH TEMPLATE LAYER IN A THERMALLY ASSISTED MAGNETIC RECORDING (TAMR) APPLICATION

RELATED PATENT APPLICATION

This application is related to the following: U.S. Pat. No. 10,262,683; assigned to a common assignee and herein incorporated by reference in its entirety.

TECHNICAL FIELD

The present disclosure relates to a TAMR writer, and in particular to a near-field transducer (NFT) also known as a plasmon generator (PG) comprised of a RhIr alloy having improved oxidation resistance compared with Rh while maintaining optimum optical properties, and where a thin Rh layer is employed as a template layer below the NFT body and optionally below the peg portion of the NFT for better robustness to defects caused by different microstructures in the peg and NFT body.

BACKGROUND

To further increase the magnetic recording density of hard disk drive (HDD) systems, there is an increasing demand to improve the performance of thin film magnetic heads. A perpendicular magnetic recording (PMR) head that combines a single pole writer with a tunneling magnetoresistive (TMR) reader provides a high write field and large read-back signal to provide enhanced area density capability (ADC). However, increasing the magnetic recording areal density requires smaller grain sizes in the magnetic recording media, which in turn reduces storage lifetime. In order to maintain durable storage lifetime, media thermal stability has to be increased. Consequently, the magnetic field generated by the writer's main pole as well as the current from the coil around the main pole may not be strong enough to switch the magnetic recording bits for data recording.

To solve this magnetic recording dilemma, TAMR was introduced. TAMR involves raising the temperature of a small region of the magnetic medium to near its Curie temperature where its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. The near-field light is generated from plasmons excited by irradiation with light propagated through a metal layer. Light typically originates from a laser diode mounted on the backside of a slider and may be in a transverse electric (TE) or transverse magnetic (TM) mode. A beam is directed through a dielectric waveguide to a metal layer (NFT) with a front portion that is often called a peg because of a metallic nanostructure and rod-like shape. The peg generates near-field light efficiently by exciting surface plasmon (SP) or surface wave of free electrons bound at the metal-dielectric interface. NFT structure and geometry are engineered to enable efficient energy transfer from the waveguide to NFT body and peg, to excite local surface plasmon resonance, and to utilize a so-called lightning rod effect to further improve field confinement. Note that peg down-track and cross-track dimensions at the ABS largely dictate optical power intensity on the magnetic recording layer.

Figure 1:
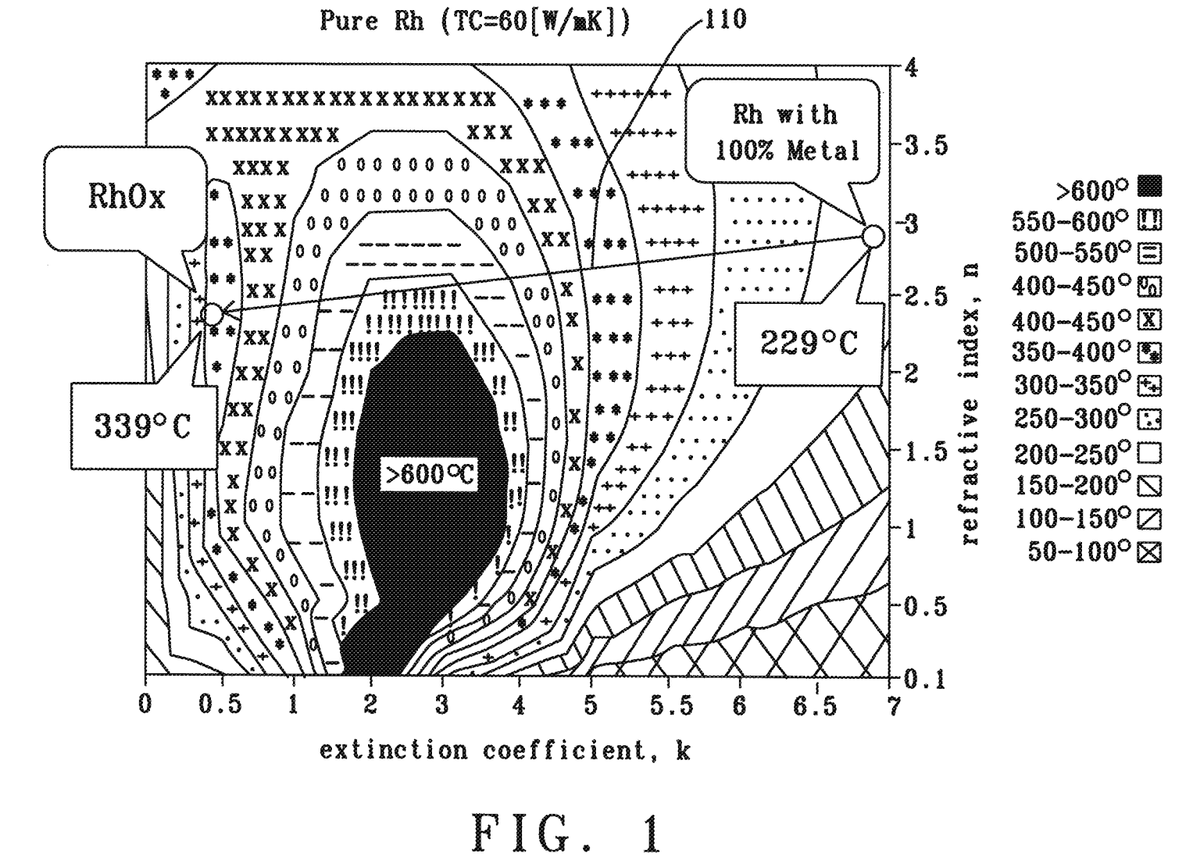
FIG. 1 is a plot of a simulation where temperature rise in a Au/Rh NFT is shown as a function of the Rh oxidation state, extinction coefficient, and refractive index.

In related U.S. Pat. No. 10,262,863, a self-aligned Au/Rh bi-layer PG is disclosed to realize acceptable optical properties and reliability. In the design, Pt group materials such as Pt, Rh, and Ir are selected as PG materials for achieving acceptable optical properties and robustness (reliability). Thus, the PG material needs not only to be highly SP efficient, but must be reliable under high temperature irradiation during a TAMR writing process. Although Au has excellent SP performance, the metal softens at temperatures above 100° C. and tends to form voids that cause defects and variability in TAMR performance. Rh is preferred in terms of good optical properties due to the large availability of free electrons and low optical absorption (reduced heating) in the plasmonic metal. However, Rh is susceptible to oxidation that leads to a degradation in plasmon efficiency and an undesirable increase in PG temperature. FIG. 1 shows simulated results where PG temperature rise is a factor of refractive index (n), extinction coefficient (k) and the Rh oxidation state. PG temperature increases from 229° C. for Rh metal (unoxidized) to 339° C. for pure RhOx, and there are regions with an intermediate oxidation state that have an even greater temperature rise.

U.S. Pat. No. 8,427,925 discloses the addition of 0.5 to 30 atomic % of Rh to Au in order to suppress oxidation and improve reliability. However, ADC performance for an AuRh alloy PG is not as good as a gold peg, which narrows the extendibility of TAMR technology.

In TAMR technology, the template for the peg is typically a dielectric layer while the NFT body is formed on a metal layer, which leads to different microstructures (grain sizes) in the peg and body portions of the NFT because grain size is influenced by the surface energy of the underlayer. We have observed a crack formation (rupture) proximate to a backside of the peg after heating because of the aforementioned difference in microstructure, especially when the peg has a thickness<40 nm in order to enhance TAMR performance. Therefore, minimizing a variety of defects including voids for a Au peg, and cracks proximate to the peg and NFT body interface must be considered when optimizing a NFT structure.

Currently, there is no TAMR NFT that exhibits an acceptable defect level and ADC for a successful commercial product. Therefore, a new NFT structure is needed where PG composition is optimized not only for ADC performance, but also for improved resistance to defect formation.

SUMMARY

One objective of the present disclosure is to provide a NFT structure that enables better TAMR device reliability without compromising ADC performance.

A second objective of the present disclosure is to provide a TAMR device according to the first objective where reliability is maintained even with a peg thickness less than 40 nm.

A third objective of the present disclosure is to provide a method of forming the NFT structure according to the first two objectives, and where the TAMR device is fabricated using existing materials and processes.

According to a first embodiment of the present disclosure, these objectives are achieved with a TAMR write head in a combined read-write head wherein a NFT made of a Au/RhIr alloy bilayer is formed with a peg front side at the ABS, and is positioned in a down-track direction between a main pole (MP) and a waveguide (WG). The bottom Au layer is recessed from the ABS and has a bottom surface separated from the WG by a WG top cladding layer. The upper RhIr alloy layer preferably comprises from 20 atomic % to 80 atomic % Ir to provide resistance to oxidation while maintaining acceptable optical properties. The upper RhIr layer has a front portion (peg) with a rectangular shaped front side, and two sides that are equidistant from a center plane, and from a top-down view has a rod-like shape with a lengthwise dimension oriented orthogonal to the ABS and a backside at a first height. The RhIr back portion (body) has a front side that interfaces with a backside of the peg, and from a top-down view, has two sides separated by increasing distance in a cross-track direction with increasing distance from the peg, and terminating at a backside that is parallel to the ABS and at a second height.

Preferably, the top surfaces of the peg and RhIr body are coplanar. In the first embodiment, the RhIr layer has a uniform thickness from the ABS to the backside thereof at the second height. The peg bottom surface contacts the top surface of the first dielectric spacer that is formed on the WG top cladding layer. The RhIr body bottom surface adjoins the top surface of the Au layer. A dielectric (NFT cladding) layer adjoins the sides of the NFT. In the exemplary embodiment, there is a second dielectric spacer on the peg top surface that extends a third height from the ABS to a front side of a heat sink (HS), which is formed on the NFT body. The third height is preferably greater than the first height. The HS has a tapered side connecting the front side to a top surface that is parallel to the NFT top surface.

A non-magnetic MP spacer is formed on the second dielectric spacer, and on the HS sloped side and top surface, and acts as a diffusion barrier to prevent interdiffusion between the MP and HS. Thus, the MP, with a front side at the ABS, contacts the top surface of the non-magnetic MP spacer. The WG is a high index dielectric material such as TaOx and has an upper WG portion with a front side at the ABS. However, a lower WG portion has a tapered front side that is separated from the ABS by a low index dielectric layer (blocker) that serves to suppress waveguide modes in the lower WG portion. The blocker prevents uncoupled waveguide light from reaching the magnetic medium and thereby avoids degraded thermal confinement of the heating spot on the media.

The NFT cladding layer, WG top cladding layer, and first and second dielectric spacers mentioned previously are made of a low index dielectric material such as SiOx. The HS is typically made of Au, but may also be selected from one of Ru, Rh, Ir, or Cu.

According to a second embodiment, the features of the first embodiment are retained and a Rh underlayer is inserted as a template for the RhIr layer and extends from the ABS to the second height. As a result, the Rh underlayer separates the upper RhIr layer from both of the first dielectric spacer and bottom Au layer. The Rh underlayer is advantageously used to ensure that the peg and RhIr body have essentially the same microstructure since they are grown on the same template layer. Furthermore, rupture defects proximate to the peg/RhIr body interface are avoided in the NFT even with a peg thickness less than 40 nm.

A third embodiment retains all the features of the second embodiment except a front side of the Rh underlayer is recessed from the ABS to a height proximate to the first height. In other words, the Rh underlayer contacts at least the entire top surface of the Au layer, and in some cases adjoins a portion of the first dielectric spacer top surface that is proximate to the Au layer front side. This structure does not cause rupture issues even when the peg thickness is below 40 nm, and increases robustness of the peg proximate to the ABS.

The present disclosure also encompasses a method of fabricating the NFT with a Rh underlayer below an upper RhIr layer according to the second and third embodiments. A series of steps is described with respect to a down-track cross-sectional view at a center plane that is orthogonal to the ABS and bisects the NFT, and from a top-down view.

DETAILED DESCRIPTION

The present disclosure is a TAMR device wherein a NFT structure is designed for improved reliability even for peg thicknesses less than 40 nm, and where temperature rise is minimized by avoiding oxidation in a RhIr alloy NFT. In the drawings, the y-axis is the cross-track direction, the z-axis is the down-track direction, and the x-axis is a direction orthogonal to the ABS and towards a back end of the device. A top surface indicates a side of a layer that faces the bottom surface of an overlying MP, and a bottom surface faces the underlying waveguide. A "high index" dielectric layer is defined as a material having a refractive index greater than 2.0 while a "low index" dielectric layer relates to a refractive index less than about 1.6. A front side of a layer is either at the ABS or faces the ABS while a backside of a layer faces away from the ABS.

Figure 2:
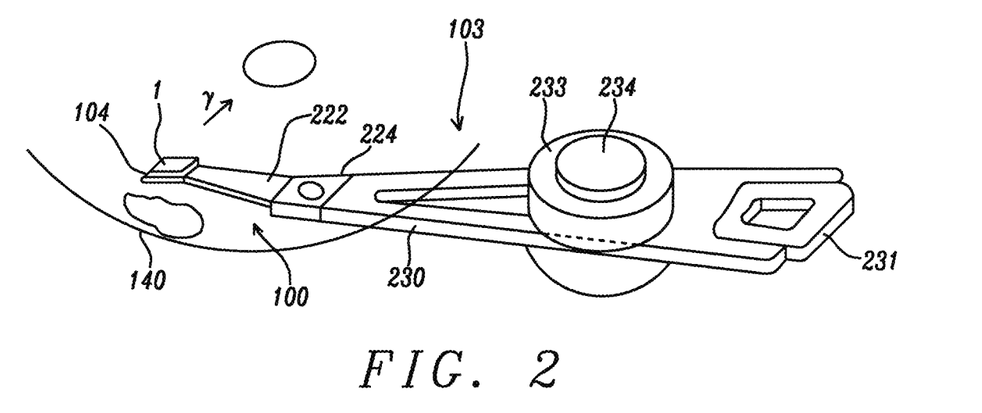
FIG. 2 is a perspective view of a head arm assembly of the present disclosure.

Referring to FIG. 2, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 3:
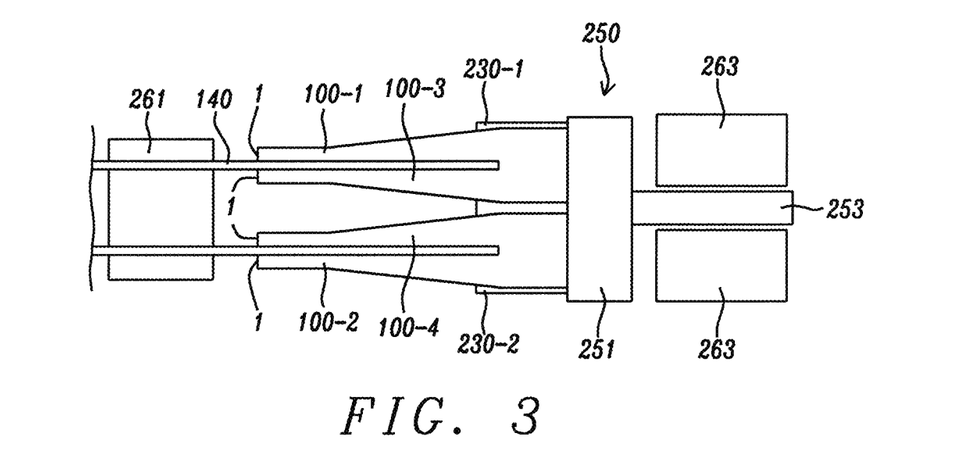
FIG. 3 is side view of a head stack assembly of the present disclosure.

Next, a side view of a head stack assembly (FIG. 3) and a plan view of a magnetic recording apparatus (FIG. 4) wherein the magnetic recording head 1 is incorporated are depicted. The head stack assembly 250 is a member to which a plurality of HGAs (HGA 100-1 and HGA 100-2 are at outer positions while HGA 100-3 and HGA 100-4 are at inner positions in the illustration) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 2) of the voice coil motor is mounted at the opposite side of each arm in carriage 251. The voice coil motor has a permanent magnet 263 arranged at an opposite position across the coil 231.

Figure 4:
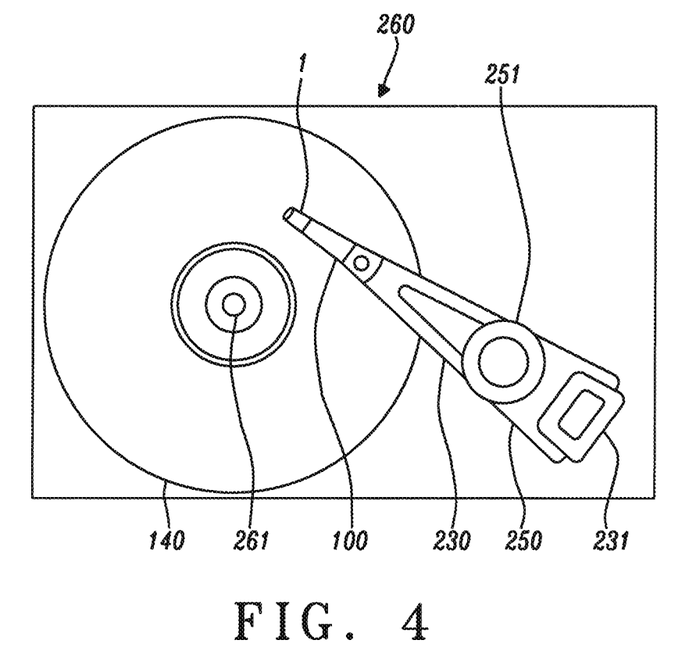
FIG. 4 is a plan view of a magnetic recording apparatus of the present disclosure.

With reference to FIG. 4, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 5:
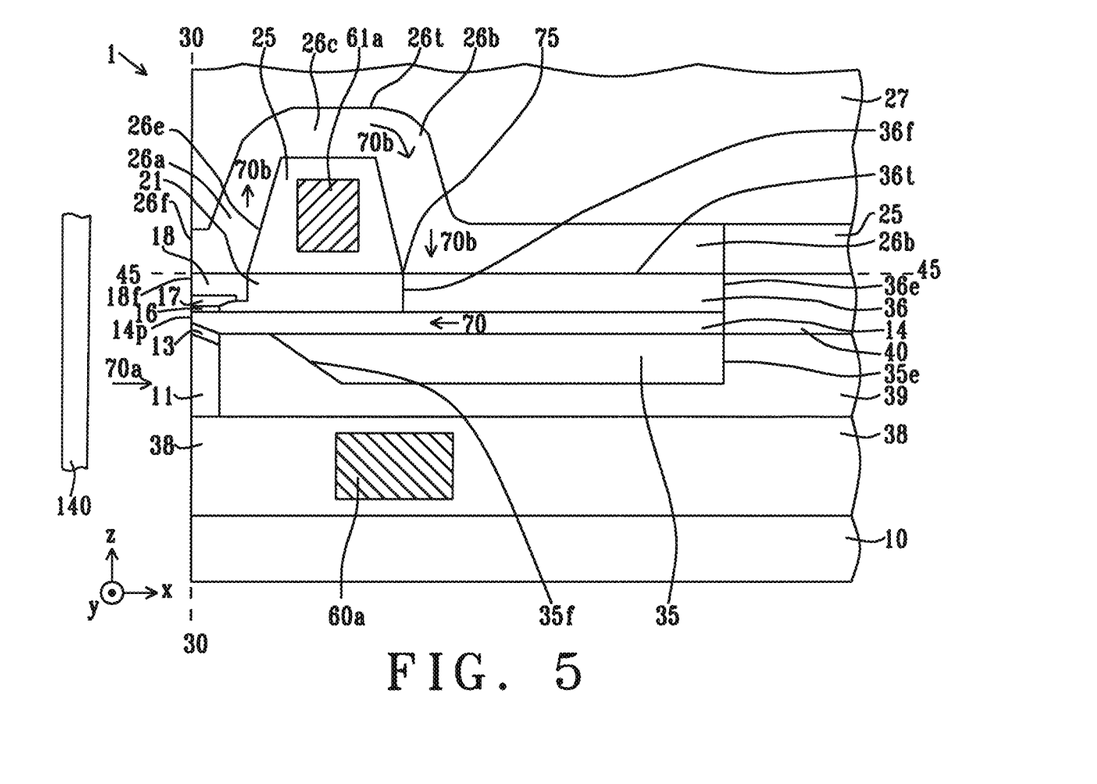
FIG. 5 is a down-track cross-sectional view of a write head portion of a combined read-write head according to an embodiment of the present disclosure.

Referring to FIG. 5, magnetic recording head 1 comprises a combined read-write head. However, only the write head portion is shown. The down-track cross-sectional view is taken along a center plane (44-44 shown in FIG. 7C) formed orthogonal to the ABS 30-30, and that bisects the main pole layer 14. The combined read-write head is formed on a substrate (not shown) that may be comprised of AlTiC (alumina+TiC). The substrate is typically part of a slider formed in an array of sliders on a wafer. After the combined read-write head is fabricated, the wafer is sliced to form rows of sliders. Each row is typically lapped to afford an ABS before dicing to fabricate individual sliders that are used in a magnetic recording device.

The present disclosure anticipates that various configurations of a write head may be employed. In the exemplary embodiment, magnetic flux 70 in main pole (MP) layer 14 is generated with flowing a write current called $I_w$ (not shown) through bucking coil 60a and driving coil 61a that are below and above the MP layer, respectively, and are connected by interconnect (not shown). Magnetic flux (write field) 70 exits the MP layer at pole tip 14p at the ABS 30-30 and is used to write a plurality of bits on magnetic medium 140. Write gap 16 and leading gap 13 contact top and bottom MP surfaces, respectively, at the ABS. Magnetic flux (return field) 70b returns to the MP through a trailing loop comprised of trailing shield 17, write shield (WS) 18 with front side 18f at the ABS, an uppermost trailing shield (PP3) 26a-26c connecting the WS to the top yoke, and top yoke (TY) 36. In the exemplary embodiment, the PP3 front portion 26a has a front side 26f at the ABS, but in other embodiments the front side may be recessed from the ABS. PP3 center portion 26c connects the PP3 front portion to PP3 back portion 26b that contacts the TY top surface 36t behind the driving coil. TY front side 36f is typically below point 75 where a front side of PP3 back portion contacts the TY. The WS and TY are separated with dielectric layer 21, and each has a top surface at plane 45-45. Insulation layer 25 surrounds the driving coil and is formed on dielectric layer 21. Dielectric layer 40 adjoins TY backside 36e and a MP backside. A protection layer 27 covers the PP3 shield and is made of an insulating material such as alumina.

In the exemplary embodiment that features a non-double write shield (nDWS) scheme, there is a leading return loop for magnetic flux 70a that terminates at leading shield 11. In an alternative embodiment (not shown), there is a leading shield connector and S2 connector (S2C) in dielectric layer 38 between the ABS 30-30 and bucking coil 60a, a return path (RTP) in dielectric layer 10, and a back gap connection (BGC) formed between the RTP and bottom yoke 35 that provide a continuous magnetic connection for magnetic flux 70a to return to MP 14. The bottom yoke 35 is formed in dielectric layer 39, and has a tapered front side 35f and a backside 35e. Dielectric layers 10, 13, 16, 21, 25, 27, and 38-40 are employed as insulation layers around magnetic and electrical components.

Figure 6:
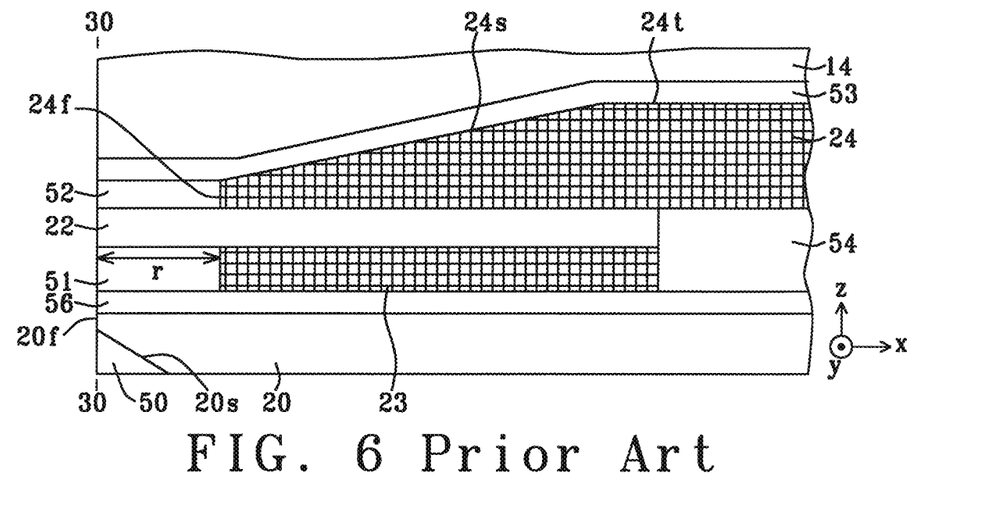
FIG. 6 is a down-track cross-sectional view of a TAMR head known to the inventors where a NFT has a front portion (Rh peg) formed on a first dielectric spacer, and a Au/Rh bilayer body behind the peg.

Referring to FIG. 6, a NFT structure known to the inventors is formed in the lead gap (not shown) and between the MP 14 and WG 20. In the exemplary embodiment, the WG is a high index material such as TaOx and has an upper portion with a front side 20f at the ABS 30-30, and a lower portion that is separated from the ABS by a low index dielectric layer 50 called a blocker. The blocker prevents uncoupled waveguide light from reaching the magnetic medium and thereby avoids unwanted heating of bits adjacent to the bit that is to be written to. Blocker 50 has decreasing thickness with increasing distance (height) from the ABS, and interfaces with tapered front side 20s of the lower WG portion. There is a top cladding layer 56 adjoining a WG top surface. A second low index dielectric layer (first dielectric spacer) 51 is formed on the WG top cladding layer, and a lower NFT Au layer 23 contacts a back side of the first dielectric spacer, and has a front side 23f that is recessed to height r of 3 nm to 10 nm from the ABS. The upper NFT layer 22 is made of Rh and contacts the top surfaces of the first dielectric spacer up to height r, and of the Au layer, and has a front portion called a peg formed on the first dielectric spacer and with a front side at the ABS.

Above the upper NFT layer is a third low index dielectric layer 52 that extends from the ABS to a front side of heat sink (HS) 24. The HS has a tapered surface 24s that connects the HS front side with the HS top surface 24t, wherein the latter is orthogonal to the ABS. Thus, the HS tapered surface becomes increasingly farther from the NFT with increasing distance from the HS front side. A non-magnetic MP spacer 53 is formed on third low index dielectric layer and HS, and is substantially conformal to the topography of layers 52 and 24. Above the non-magnetic spacer is MP 14. As indicated earlier with regard to FIG. 1, a major concern with this Au/Rh bilayer NFT is that Rh is susceptible to oxidation that causes significantly higher peg temperatures that lead to degradation and poor reliability.

Figure 7A:
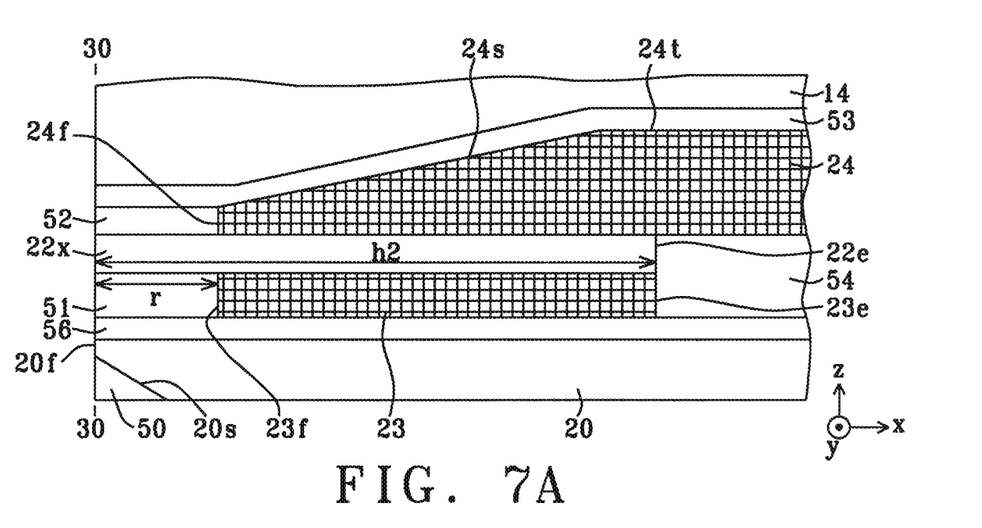
FIGS. 7A-7C are a down-track cross-sectional view, top-down view, and ABS view, respectively, of a TAMR head according to a first embodiment of the present disclosure wherein a NFT has a RhIr alloy peg on a first dielectric spacer, and a RhIr body formed on an Au layer behind the peg.

We have discovered that by replacing Rh in the Au/Rh bilayer NFT with a RhIr alloy where Ir content is maintained within a range of 20 atomic % to 80 atomic %, NFT oxidation is avoided and temperature rise in the peg is controlled such that device reliability is significantly enhanced. Referring to FIG. 7A, a first embodiment of the present disclosure is shown from a down-track cross-sectional view at a center plane (44-44 in FIG. 7C) and retains all the features of the NFT structure in FIG. 6 except upper NFT layer 22x comprises the aforementioned RhIr alloy. The upper RhIr alloy layer preferably has a backside 22e at the same height h2 from ABS 30-30 as backside 23e of the lower Au layer 23. WG 20 is a high index material while dielectric layers 50-52 are low index materials made of silicon oxide or aluminum oxide, for example. Dielectric layer 51 and dielectric layer 52 are hereinafter referred to as the first dielectric spacer, and second dielectric spacer, respectively. HS 24 is preferably comprised of Au, but may be selected from other materials such as Ru, Rh, Ir, or Cu. The heat sink compensates for MP heating caused by proximity of the MP to RhIr layer 22x and the elevated NFT temperature during a write process. As explained later, the lower Au layer is preferably self aligned to the body portion of the RhIr layer, and is responsible for absorbing light from the WG that is subsequently transmitted to the NFT upper layer and converted into plasmon energy.

Non-magnetic MP spacer 53 is comprised of Rh, Ru, Ir, or an alloy thereof, and serves as a diffusion barrier to prevent inter diffusion of metal between MP 14 and HS 24.

Figure 7B:
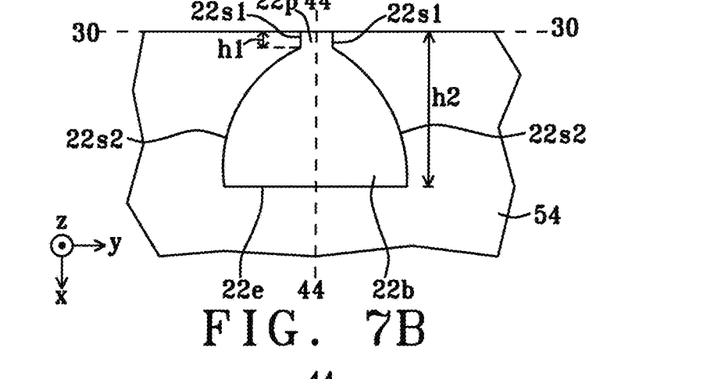

FIG. 7B depicts a top-down view of the NFT and adjoining fourth low index dielectric layer 54 with overlying layers removed. Upper RhIr layer 22x is comprised of a peg 22p with a rod-like shape that extends to height h1 from ABS 30-30 and has sides 22s1 aligned orthogonal to the ABS and formed equidistant from center plane 44-44. The NFT also comprises RhIr body 22b that interfaces with the peg at height h1 and extends to a backside at height h2. NFT body sides 22s2 are separated with increasing cross-track width with increasing distance from height h1, and terminate at backside 22e. In some embodiments, sides 22s2 may be essentially linear instead of having curvature in the exemplary embodiment. The fourth low index dielectric layer is known as a NFT cladding layer and also contacts the NFT backside. It should be understood that the first dielectric spacer and lower NFT Au layer (not shown) have essentially the same shape as that of the RhIr body.

Figure 7C:
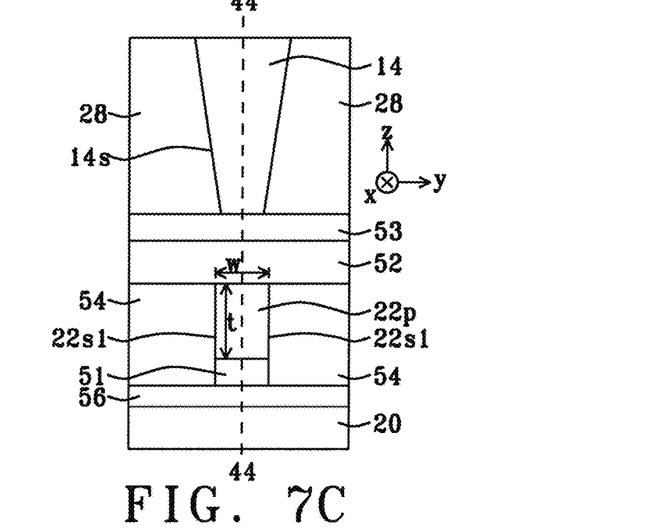

In FIG. 7C, an ABS view of the first embodiment is illustrated and shows that MP 14 is aligned above RhIr peg 22p and both are bisected by center plane 44-44. In the exemplary embodiment, heat sink 28 contacts each MP side 14s and may be made of the same material as in HS 24. The peg typically has a rectangular shaped profile with a cross-track width w where sides 22s1 are substantially parallel to the center plane. In advanced TAMR devices, thickness t may be less than 40 nm for enhanced ADC. First dielectric spacer 51 has the same width w at the ABS as the peg.

Figure 8A:
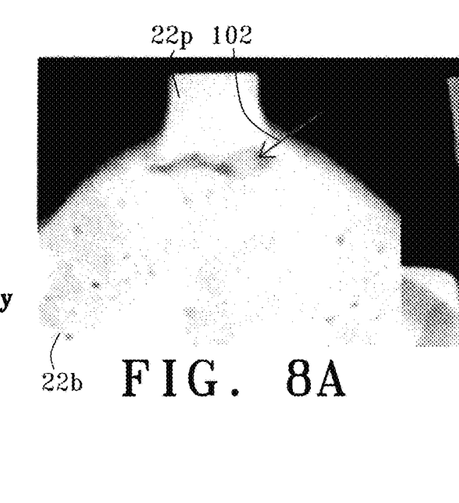
FIG. 8A and FIG. 8B are top-down and cross-sectional transmission electron microscopy (TEM) images, respectively, of a self aligned NFT where a RhIr peg is formed on a first dielectric spacer and the RhIr body is on an Au layer, and where a crack (rupture) defect is shown proximate to the peg/body interface.
Figure 8B:
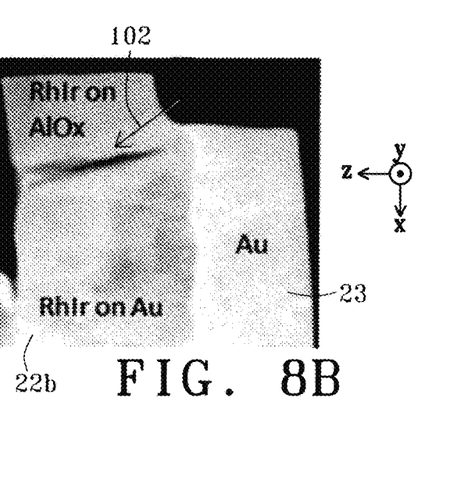

Referring to FIG. 8A, a top-down view of a TEM image is shown for a self-aligned Au/RhIr NFT bilayer with a peg thickness less than 40 nm and where the peg 22p is formed on an AlOx dielectric layer (not shown), and the NFT body comprises upper RhIr layer 22b and lower Au layer 23 similar to that in FIG. 7A. As mentioned previously, because the RhIr peg and body portions are grown on different template layers, each has a different microstructure with a different resistivity. As a result, during a TAMR write process there is a sufficient temperature difference between the RhIr peg and body that a rupture defect 102 has a tendency to occur proximate to their interface. FIG. 8B is a down-track cross-sectional view of the NFT structure in FIG. 8A.

Figure 9A:
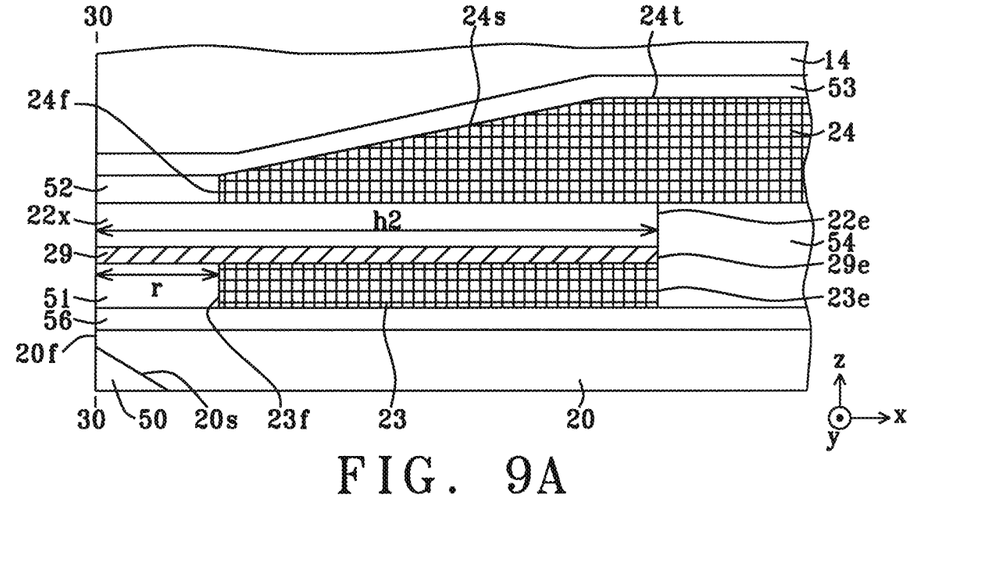
FIGS. 9A-9B are down-track cross-sectional and ABS views, respectively, of the second embodiment of the present disclosure wherein the TAMR head of the first embodiment is modified to include a Rh underlayer below the RhIr alloy layer, and formed on the underlying first dielectric spacer and Au layer.

In order to overcome the different NFT microstructures, a second embodiment of the present disclosure is disclosed as shown in FIG. 9A where a Rh underlayer 29 with a thickness of 10 Angstroms to 200 Angstroms adjoins the RhIr layer bottom surface and extends from the ABS 30-30 to a backside at height h2. Thus, all features of the first embodiment are retained except the Rh underlayer contacts the top surfaces of first dielectric spacer 51 and NFT Au layer 23. Since both of the RhIr peg 22p and RhIr body 22b are now formed on the same underlayer, all regions of the upper NFT layer have essentially the same microstructure, and rupture defects such as those shown in FIG. 8B are avoided.

Figure 9B:
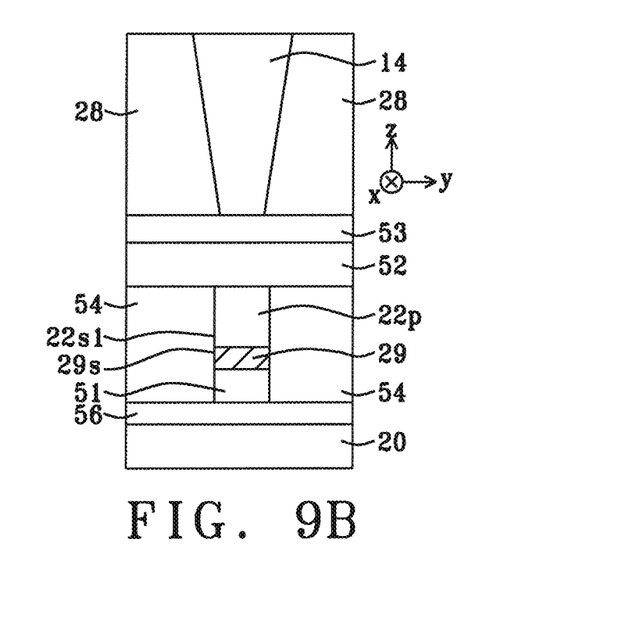

FIG. 9B is an ABS view of the second embodiment. Note that RhIr peg 22p and the Rh underlayer 29 are self-aligned such that peg side 22s1 is coplanar with underlayer side 29s. In other embodiments, the underlayer may be comprised of Ir or Ru instead of Rh. Moreover, the present disclosure anticipates that the underlayer may have a bilayer structure such as Al/Rh or Zr/Rh where Al or Zr are the bottom layer having a thickness from 2 Angstroms to 10 Angstroms to promote adhesion to first dielectric spacer 51, and wherein the upper Rh layer has a thickness from 10 Angstroms to 200 Angstroms.

Figure 10:
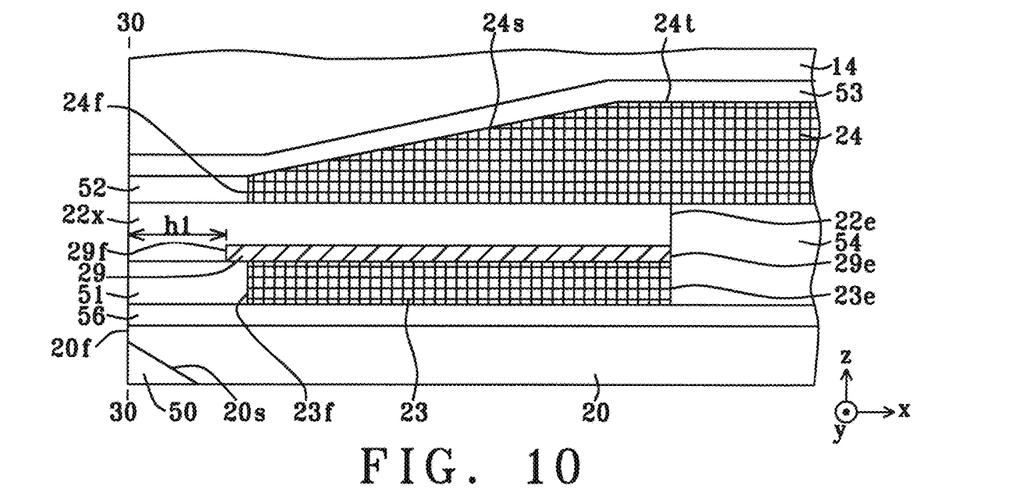
FIG. 10 is a down-track cross-sectional view of a third embodiment of the present disclosure where the Rh underlayer in the second embodiment is modified to have a front side recessed from the ABS so that the RhIr peg adjoins a substantial portion of the first dielectric spacer top surface up to the first height.

According to a third embodiment of the present disclosure depicted in FIG. 10, the Rh underlayer feature of the second embodiment is retained except the Rh underlayer front side 29f is recessed to height h1 so that only the RhIr body is formed on the Rh underlayer while the RhIr peg 22p contacts first dielectric spacer 51 from the ABS 30-30 to height h1. Although the RhIr peg and RhIr body are formed on different template layers, we have found that the resistivity difference between the RhIr peg and body is sufficiently small to avoid rupture defects shown in FIG. 8B even when the peg thickness is less than 40 nm. Furthermore, this NFT structure improves the robustness of the peg proximate to the ABS.

Figure 11:
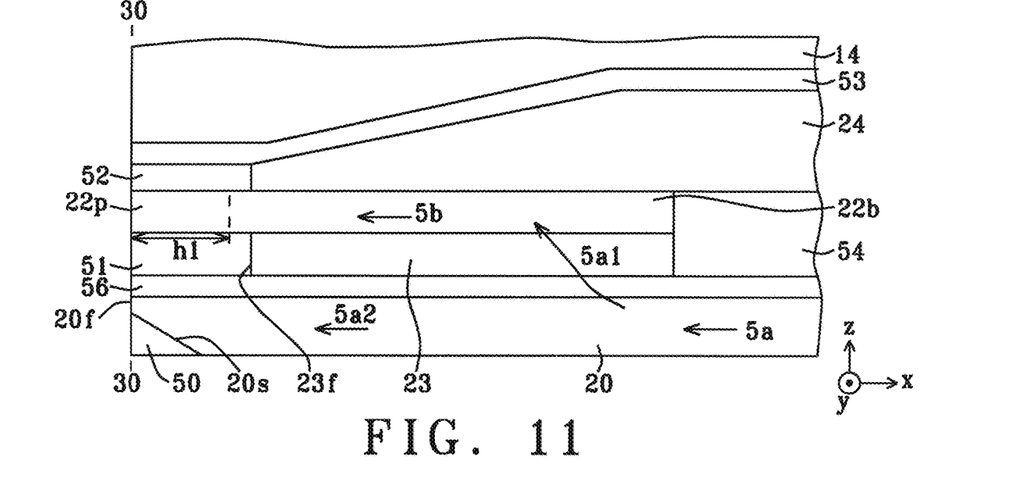
FIG. 11 is a down-track cross-sectional view of a TAMR head showing how a portion of light in a waveguide is coupled to the NFT and converted to plasmon energy that is directed to the ABS during a write operation.

Referring to FIG. 11, light 5a is generated by a laser diode (not shown) mounted on the back end of the slider on which the TAMR head is formed, and is propagated toward the ABS within waveguide 20. A substantial portion of light 5a1 is transmitted through lower Au layer 23 and is coupled to RhIr body 22b in the form of a plasmonic resonance or surface plasmon mode 5b that continues to peg 22p, and then is coupled to a heating spot on a magnetic medium (not shown) proximate to the ABS 30-30 thereby facilitating (assisting) a write process involving a magnetic bit proximate to the heating spot. The remaining waveguide light 5a2 is not coupled to the NFT and continues to propagate toward the ABS. As mentioned earlier, blocker 50 is advantageously employed to reflect a significant portion of light 5a2 to minimize the intensity of uncoupled light from exiting waveguide front side 20f1 and undesirably heating portions of the magnetic medium outside the selected bit for writing.

To demonstrate the advantages of the present disclosure compared with a prior art Au/Rh NFT structure shown in FIG. 6, an experiment was performed to determine the resistivity difference for a peg formed on AlOx, and a Rh or RhIr body contacting an Au layer. The film stacks were annealed at 225° C. for 5 hours. Rh layer 22 and RhIr layer 22x thickness was set at 40 nm for the Prior Art and Embodiment 1 (FIG. 7A), respectively. For the second embodiment shown in FIG. 8A, RhIr thickness was reduced to 30 nm. The results are shown in Table 1 below and indicate that crystal growth of the RhIr alloy is influenced by the surface energy of the underlayer, and has a significant effect on the resistivity of the upper NFT layer. In the first embodiment (row 2), there is a substantial resistivity difference of 16.4% that is responsible for rupture defects. However, in the second embodiment (row 3), the resistivity difference for a RhIr alloy is largely mitigated and reduced to 2.4%, which is even lower than the resistivity difference for the Rh layer in the prior art. Therefore, homogenization of the upper NFT layer microstructure in Embodiment 2 enables a RhIr peg thickness below 40 nm while avoiding rupture defects.

TABLE 1

Resistivity comparison for various NFT (PG) structures

| | | | Resistivity of PG film | | |
| --- | --- | --- | --- | --- | --- |
| | PG film | underlayer | formed on AU [$\mu\Omega$ cm] | formed on AlOx [$\mu\Omega$ cm] | Difference [%] |
| Prior Art | Rh | n/a | 13.2 | 12.5 | 5.6 |
| Emb. 1 | Rh50Ir50 alloy | n/a | 35.4 | 30.4 | 16.4 |
| Emb. 2 | Rh50Ir50 alloy | Rh(10A) | 26.1 | 25.5 | 2.4 |

Figure 22:
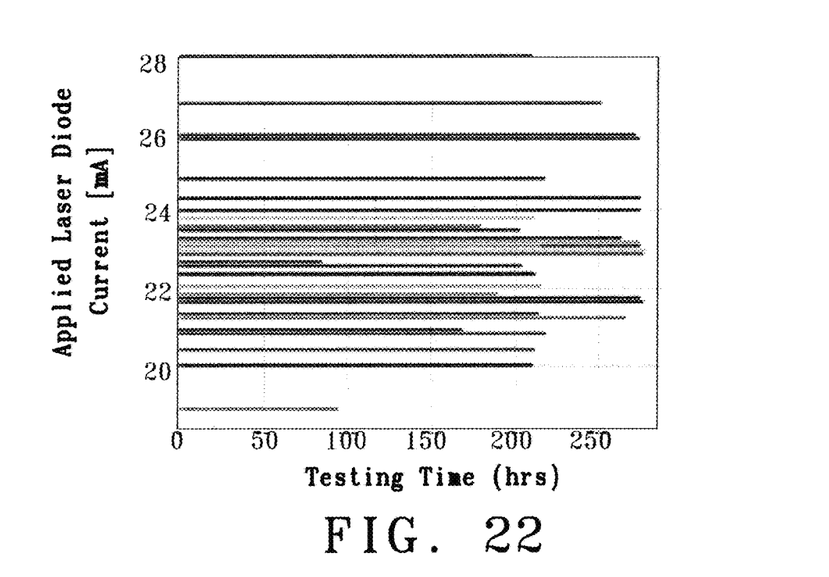
FIG. 22 shows a plot of applied laser diode current vs. test time in a TAMR head according to an embodiment of the present disclosure, and indicates there is no degradation in NFT performance over time due to NFT structure stability.

FIG. 22 illustrates the results of a reliability test of a TAMR device having a NFT structure formed according to the first embodiment, and that is incorporated in a hard disk drive (HDD). In prior art TAMR HDD, the current applied to a laser diode (LD) light source is typically increased over the device lifetime to compensate for degradation in recording performance due to NFT damage and deformation. However, FIG. 22 indicates that LD current did not require adjustment during the duration of the test and suggests that the NFT structure of the present disclosure has improved reliability and is sufficiently stable to be used in a commercial product.

Figure 12:
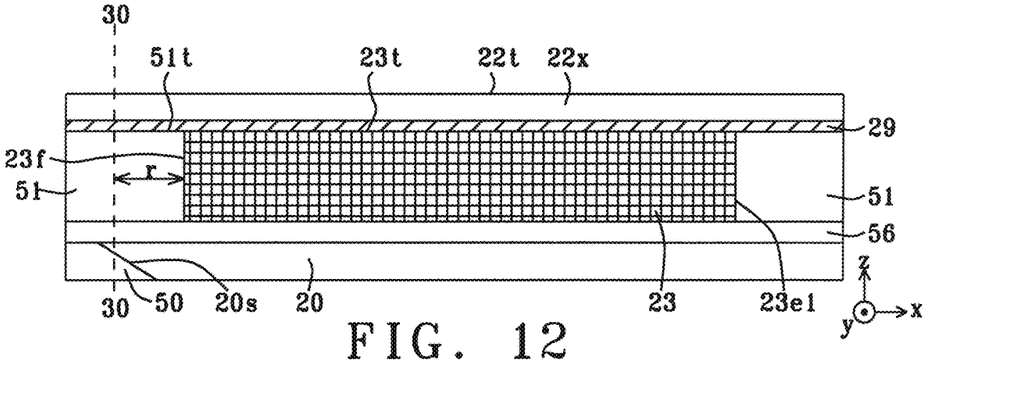
FIGS. 12-13 are down-track cross-sectional views showing the steps of forming and patterning a Au/RhIr NFT including a Rh underlayer for the RhIr layer according to the second embodiment of the present disclosure.

The present disclosure also encompasses a method of the forming the TAMR device with the NFT structure according to the second embodiment. Referring to FIG. 12, the process begins at a point where a substrate comprised of waveguide (WG) 20 with a top portion that extends to the eventual ABS (plane 30-30), and dielectric layer (blocker) 50 in front of the bottom WG portion are provided according to well-known methods that are not described herein. The bottom WG portion has sloped front side 20s that interfaces with the blocker top surface. Typically, a chemical mechanical polish (CMP) step is used to generate a planar top surface on the upper portion of WG 20. Note that an upper portion of the blocker and portions of all layers to the left of plane 30-30 will be removed in a lapping process at the backend of the fabrication sequence.

Lower Au layer 23 is formed within first dielectric spacer 51 using a method such as the process flow described in related U.S. Pat. No. 10,262,683. Au layer front side 23f is recessed to height r from plane 30-30. Thereafter, underlayer 29 preferably comprised of Rh, and then upper NFT RhIr layer 22x are sequentially deposited on the first dielectric spacer and Au layer. In some embodiments, the underlayer further comprises a bottommost Al or Zr adhesion layer to give an Al/Rh or Zr/Rh stack described previously.

Figure 13:
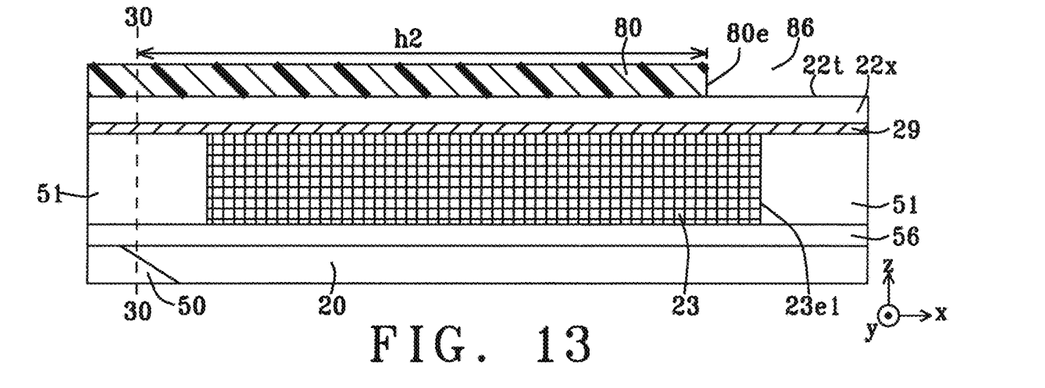

Referring to FIG. 13, a first photoresist mask 80 with backside 80e at height h2 from plane 30-30 is formed on RhIr layer 22x and opening 86 exposes a portion of RhIr layer top surface 22t. At this point, the Au layer backside 23e1 is a greater height from plane 30-30 than h2.

Figure 14:
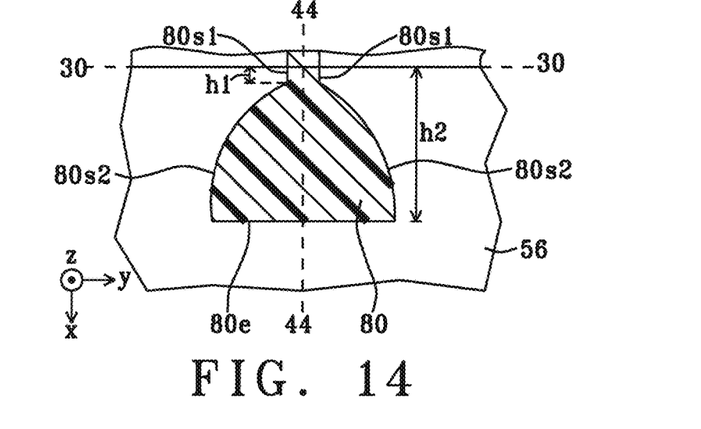
FIG. 14 is a top-down view of the photoresist mask shape that is used to pattern the Au/RhIr NFT including the Rh underlayer in FIG. 13.

FIG. 14 shows a top-down view after an ion beam etch (IBE) or reactive ion etch (RIE) is used to remove portions of upper RhIr layer 22x, underlayer 29, and Au layer 23 that are not protected by the first photoresist mask, and stops on WG top cladding layer 56. The first photoresist mask has sides 80s1 that are orthogonal to plane 30-30 and extend from the eventual ABS to height h1, and are used to define the peg shape (not shown) and the first dielectric spacer shape below the peg. Each first photoresist mask side 80s2 connects with a side 80s1 at h1 and terminates at backside 80e to define the shape of the underlying RhIr body, underlayer, and first dielectric spacer. Thus, the RhIr body is aligned above the Au layer such that the Au layer and underlayer have a top-down shape essentially the same as that of the RhIr body.

Figure 15:
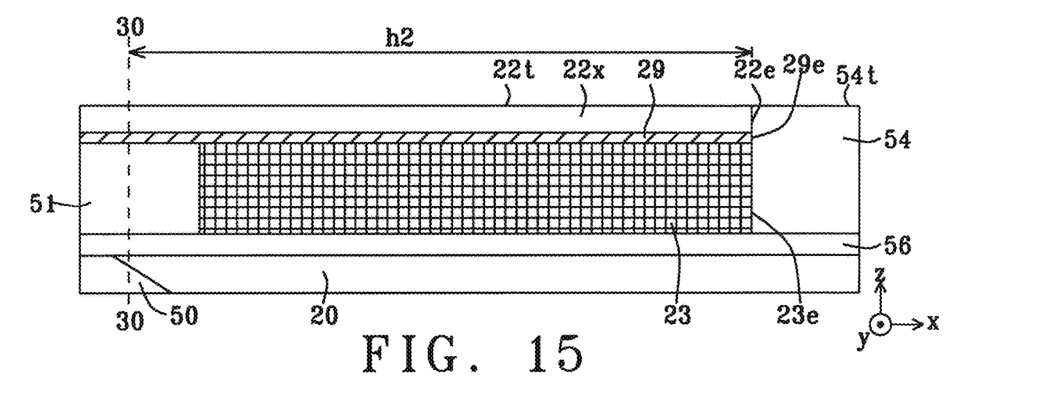
FIG. 15 is a down-track cross-sectional view of the TAMR head in FIG. 14 after an etch process is employed to transfer the mask shape through the NFT and underlayer, and then a NFT cladding layer is deposited to fill the etched opening before the photoresist mask is removed with a CMP process.

In FIG. 15, the partially formed TAMR device is shown after the fourth dielectric (cladding) layer 54 is deposited to fill the opening generated by the aforementioned IBE or RIE step. A CMP process or another planarization method may be used to remove the first photoresist mask and form cladding layer top surface 54t that is coplanar with RhIr top surface 22t. Rh underlayer 29, RhIr layer 22x, and Au layer 23 have a backside 29e, 22e, and 23e, respectively, at height h2.

Figure 16:
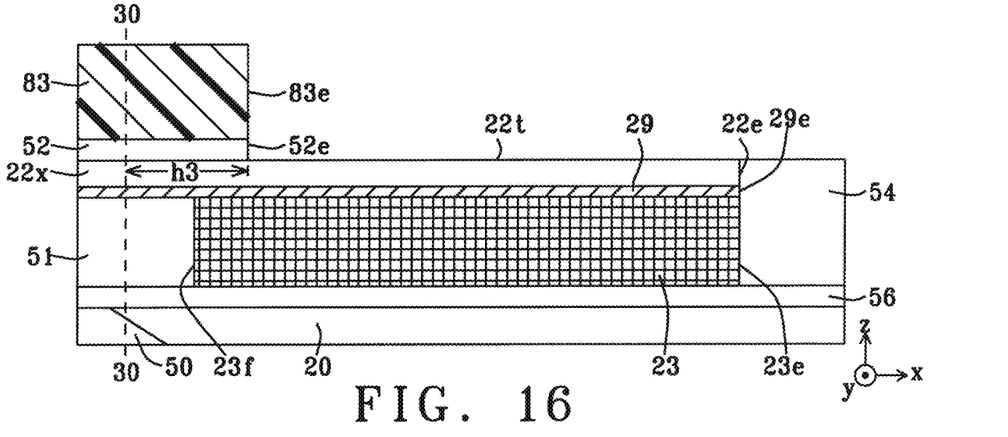
FIGS. 16-18 are down-track cross-sectional views of the TAMR head in FIG. 15 after a second dielectric spacer, heat sink, and non-magnetic MP spacer (diffusion barrier) are sequentially formed on the NFT.

Referring to FIG. 16, second dielectric spacer 52 is deposited on RhIr layer top surface 22t and on cladding layer top surface 54t. Next, a second photoresist mask 83 with backside 83e at height h3 from plane 30-30 is formed on the second dielectric spacer where h3 is preferably greater than r. An IBE or RIE process is employed to remove unprotected portions of the second dielectric spacer and stops on RhIr top surface 22t thereby generating second dielectric layer spacer backside 52e at h2.

Figure 17:
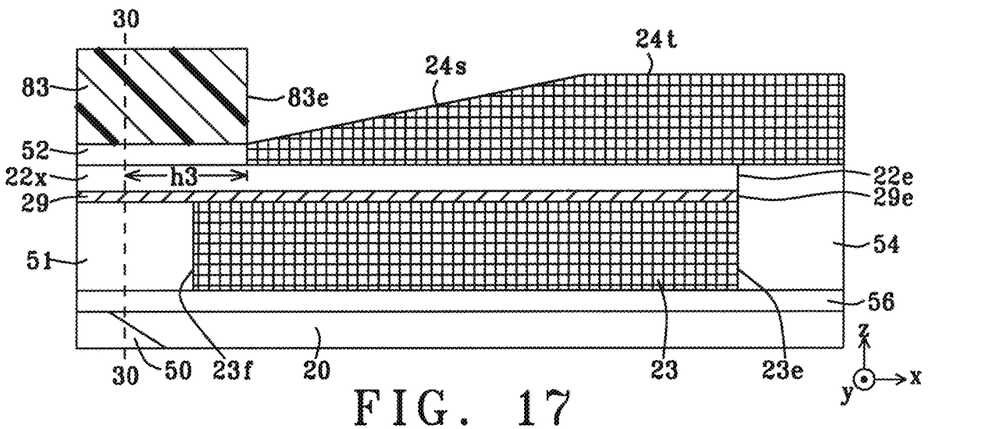

In FIG. 17, the partially formed TAMR head is depicted after the Au heat sink 24 is deposited using an ion beam deposition (IBD) process where the incident angle (not shown) is adjusted to provide tapered top surface 24s that extends from height h3 to heat sink top surface 24t. The Au heat sink below the tapered top surface is increasingly thicker with greater distance from the second dielectric spacer 52 because of a well known "shadow effect" of the photoresist mask 83.

Figure 18:
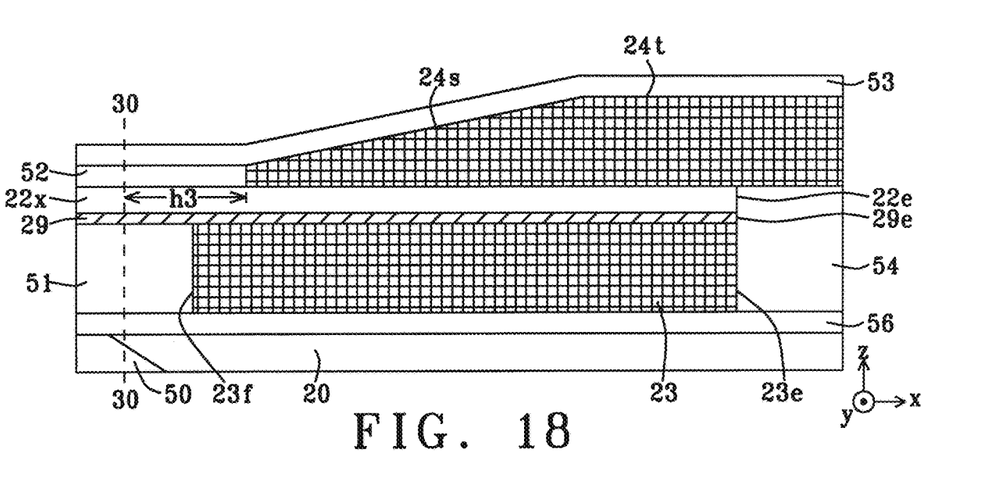

Referring to FIG. 18, the second photoresist mask is removed with a conventional method. Thereafter, non-magnetic MP spacer 53 is deposited using an IBD, for example, on the second dielectric spacer 52 and on heat sink 24.

Next, MP 14 is plated on the non-magnetic MP spacer 53, and the TAMR head as shown in FIG. 5 is completed with a conventional sequence of steps that are not described herein but are well known in the art.

Figure 19:
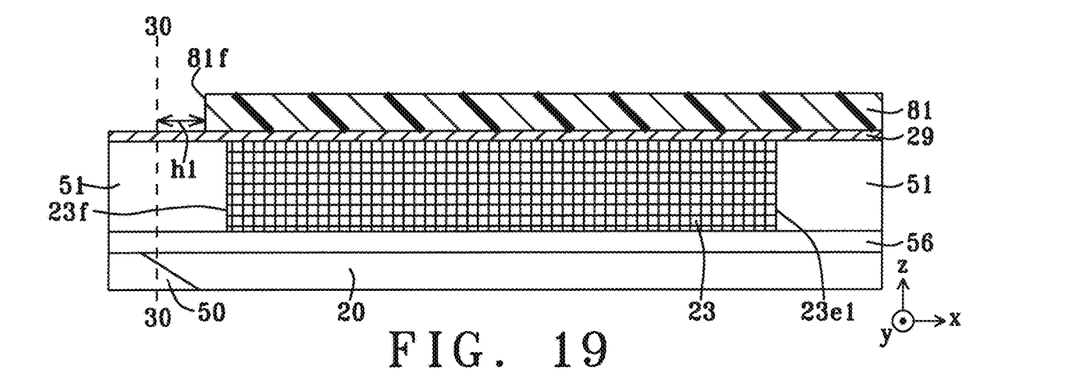
FIGS. 19-21 depict down-track cross-sectional views of various steps where the Au/RhIr NFT including a Rh underlayer for the RhIr layer are deposited and patterned according to the third embodiment of the present disclosure.

The present disclosure also encompasses a process flow for forming the NFT structure of the third embodiment where an underlayer is formed as a template for the RhIr body, but not for the RhIr peg. Referring to FIG. 19, underlayer 29 is deposited on a substrate comprised of first dielectric spacer 51 and lower NFT Au layer 23 as described previously. A third photoresist mask 81 with front side 81f that is recessed to height h1 from plane 30-30 is formed on the underlayer.

Figure 20:
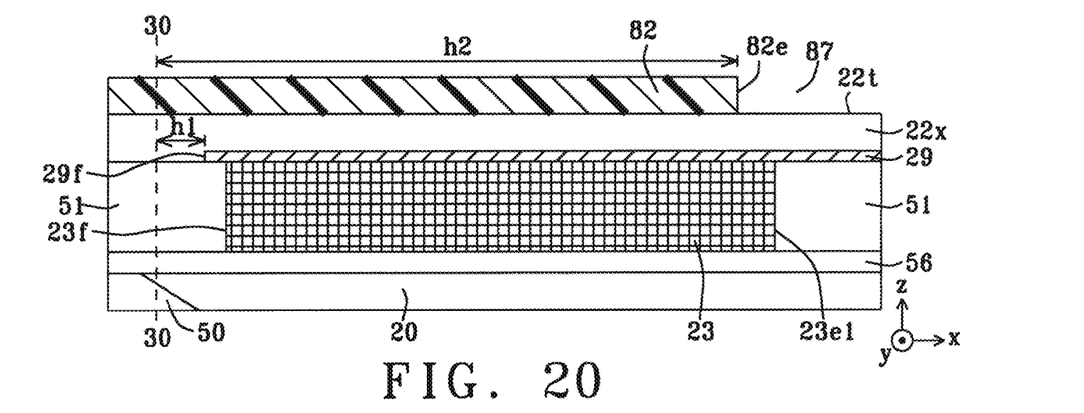

FIG. 20 depicts the partially formed TAMR device after an IBE or RIE step is employed to remove portions of underlayer 29 that are not protected by the first photoresist mask 81 and stops on the first dielectric spacer 51. Then, the third photoresist mask is removed with a conventional method, and the NFT upper RhIr layer 22x is deposited on the underlayer and on exposed portions of the first dielectric spacer. Thereafter, a fourth photoresist mask 82 with backside 82e at height h2 from plane 30-30 is formed on the RhIr layer. A portion of the RhIr top surface 22t is uncovered by opening 87 behind the fourth photoresist mask backside. The shape of the fourth photoresist mask from a top-down view (not shown) is similar to that of the first photoresist mask in FIG. 14.

Figure 21:
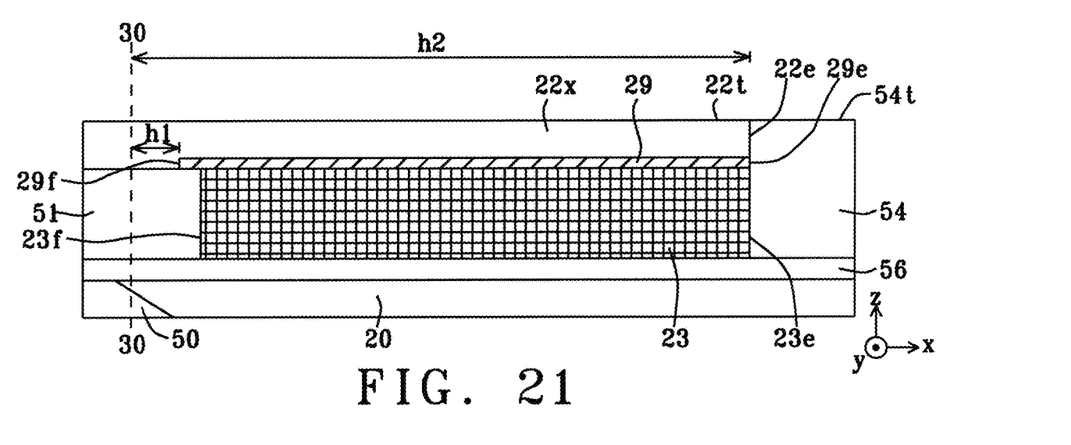

Referring to FIG. 21, another RIE or IBE is performed to remove portions of RhIr layer 22x, underlayer 29, and Au layer 23 that are not protected by the fourth photoresist mask, and stops on WG top cladding layer 56. The fourth dielectric (cladding) layer 54 is deposited in the opening formed by the aforementioned etch process. Then a CMP or another planarization step is employed to remove the fourth photoresist mask and form a cladding layer top surface 54t that is coplanar with RhIr top surface 22t.

Thereafter, the process flow shown in FIGS. 16-18 may be used to form the second dielectric spacer 52, heat sink 24, and overlying non-magnetic MP spacer 53. The remaining steps in the fabrication sequence to complete the write head including deposition of the MP 14 on non-magnetic MP spacer 53 are well known in the art and are not described herein. A backend lapping step is employed to form the ABS at plane 30-30.

While this disclosure has been particularly shown and described with reference to, the preferred embodiments thereof, it will be understood by those skilled in the art that various changes in form and details may be made without departing from the spirit and scope of this disclosure.

We claim:

1. A thermally assisted magnetic recording (TAMR) device, comprising a near field transducer (NFT) that serves as a plasmon generator, wherein said NFT comprises RhIr in an upper layer having a front side at an air bearing surface (ABS), and a lower metal layer having a different composition from the upper RhIr layer, and with a front side that is recessed from the ABS.

2. The TAMR device of claim 1 further comprising:
(a) a main pole (MP) that generates a magnetic field to switch one or more bits in a magnetic medium;
(b) a waveguide (WG) that provides light to the NFT;
(c) a first dielectric spacer formed above the WG and separating the NFT from the WG; and
(d) a second dielectric spacer formed on a front portion of the NFT and extending from the ABS to a height (h3).

3. The TAMR device of claim 2 wherein the NFT comprises:
(a) the upper RhIr layer having a front portion (peg) with a rod-like shape that extends from a front side at the ABS to a first height (h1), and a back portion (body) having a front side adjoining a peg backside, and two sides separated with increasing cross-track width until terminating at a backside at a second height (h2); and
(2) the lower metal layer that is Au below the body of the upper RhIr layer and having a backside at h2, and two sides aligned below the two sides of the upper RhIr layer.

4. The TAMR device of claim 3 further comprising a heat sink formed on the upper RhIr layer and with a front side adjoining a backside of the second dielectric layer at h3, and a non-magnetic MP spacer formed on the second dielectric spacer and heat sink, wherein the non-magnetic MP spacer serves as a diffusion barrier layer between the heat sink and MP.

5. The TAMR device of claim 3 wherein the lower Au layer has a front side that is recessed from 3 nm to 10 nm from the ABS.

6. The TAMR device of claim 3 wherein the upper RhIr layer has an Ir content that is maintained within a range of about 20 atomic % to 80 atomic %.

7. The TAMR device of claim 3 wherein h3 is greater than h1.

8. The TAMR device of claim 4 wherein the non-magnetic MP spacer is comprised of Rh, Ru, Ir, or an alloy thereof.

9. The TAMR device of claim 3 further comprised of an underlayer comprised of Rh, Ru, or Ir that is formed between the upper RhIr layer and lower Au layer.

10. The TAMR device of claim 9 wherein the underlayer extends from the ABS to the second height.

11. The TAMR device of claim 9 wherein the underlayer has a front side at h1 and a backside at h2.

12. The TAMR device of claim 9 wherein the underlayer is further comprised of Al or Zr to form an A/Rh or Zr/Rh stack wherein an upper Rh layer has a thickness of 10 Angstroms to 200 Angstroms, and a lower Al or Zr layer has a thickness from 2 Angstroms to 10 Angstroms.

13. A head gimbal assembly (HGA), comprising:
(a) the TAMR device of claim 1; and
(b) a suspension that elastically supports the TAMR device, wherein the suspension has a flexure to which the TAMR device is joined, a load beam with one end connected to the flexure, and a base plate connected to the other end of the load beam.

14. A magnetic recording apparatus, comprising:
(a) the HGA of claim 13;
(b) a magnetic recording medium positioned opposite to a slider on which the magnetic read head structure is formed;
(c) a spindle motor that rotates and drives the magnetic recording medium; and
(d) a device that supports the slider, and that positions the slider relative to the magnetic recording medium.

15. A method of fabricating a TAMR device, comprising:
(a) providing a first dielectric spacer (DS) above a waveguide (WG), and a Au near field transducer (NFT) layer within the first DS and with a top surface that is coplanar with a first DS top surface, and wherein the Au NFT layer has a front side recessed to height (r) from a first plane;
(b) depositing an underlayer comprised of Rh on the first DS and Au NFT layer top surfaces, and forming a front side on the underlayer at a first height (h1) from the first plane where r>h1 thereby exposing a portion of the first DS top surface;
(c) depositing a RhIr NFT layer on the exposed portion of first DS top surface and on the underlayer; and
(d) patterning the RhIr NFT layer and underlayer to form a front portion (peg) on the RhIr NFT layer having a first width and that extends from the first plane to h1, and a RhIr NFT back portion (body) having sidewalls separated with increasing cross-track width with increasing distance from a front side at h1 to a backside at a second height (h2), and where the underlayer also has a backside at h2.

16. The method of claim 15 further comprising:
(a) forming a second DS on the patterned RhIr NFT layer wherein the second DS extends from the first plane to a third height (h3) where h3>h1;
(b) forming a heat sink on the RhIr NFT body and adjoining a backside of the second DS, and then depositing a non-magnetic main pole (MP) spacer on the second DS and heat sink;
(c) depositing a MP on the non-magnetic MP spacer; and
(d) performing a lapping process to form an air bearing surface (ABS) at the first plane.

17. The method of claim 15 wherein the Rh underlayer has a thickness from 10 Angstroms to 200 Angstroms.

18. The method of claim 15 wherein the RhIr NFT layer has an Ir content from about 20 atomic % to 80 atomic %.

19. The method of claim 15 wherein the Rh underlayer further comprises Al or Zr in an Al/Rh or Zr/Rh stack wherein a lower Al or Zr layer has a thickness from 2 Angstroms to 10 Angstroms, and an upper Rh layer has a thickness from 10 Angstroms to 200 Angstroms.

20. The method of claim 15 wherein the non-magnetic MP spacer is made of Rh, Ru, Ir, or an alloy thereof.

21. A method of fabricating a TAMR device, comprising:
(a) providing a first dielectric spacer (DS) on a waveguide (WG), and a Au near field transducer (NFT) layer within the first DS and with a top surface that is coplanar with a first DS top surface, and wherein the Au NFT layer has a front side recessed to height (r) from a first plane;
(b) depositing an underlayer comprised of Rh on the first DS and Au NFT layer top surfaces;
(c) depositing a RhIr NFT layer on the underlayer; and
(d) patterning the RhIr NFT layer and underlayer to form a front portion (peg) on the RhIr NFT layer having a first width and that extends from the first plane to a first height (h1), and a RhIr NFT back portion (body) having sidewalls separated with increasing cross-track width with increasing distance from a front side at h1 to a backside at a second height (h2), and where the underlayer also has a backside at h2.

22. The method of claim 21 further comprising:
(a) forming a second DS on the patterned RhIr NFT layer wherein the second DS extends from the first plane to a third height (h3) where h3>h1;
(b) forming a heat sink on the RhIr NFT body and adjoining a backside of the second DS, and then depositing a non-magnetic main pole (MP) spacer on the second DS and heat sink;
(c) depositing a MP on the non-magnetic MP spacer; and
(d) performing a lapping process to form an air bearing surface (ABS) at the first plane.

23. The method of claim 21 wherein the Rh underlayer has a thickness from 10 Angstroms to 200 Angstroms.

24. The method of claim 21 wherein the RhIr NFT layer has an Ir content from about 20 atomic % to 80 atomic %.

25. The method of claim 21 wherein the Rh underlayer further comprises Al or Zr in an A/Rh or Zr/Rh stack wherein a lower Al or Zr layer has a thickness from 2 Angstroms to 10 Angstroms, and an upper Rh layer has a thickness from 10 Angstroms to 200 Angstroms.

26. The method of claim 21 wherein the non-magnetic MP spacer is made of Rh, Ru, Ir, or an alloy thereof.

* * * * *